Patented Apr. 5, 1932

1,852,998

UNITED STATES PATENT OFFICE

CARLETON ELLIS, OF MONTCLAIR, NEW JERSEY

WATER AND FIRE RESISTANT COATED MATERIAL

No Drawing.   Application filed October 4, 1924. Serial No. 741,762.

This application is in part a continuation of matter disclosed in my co-pending applications, Serial Nos. 442,245, 480,565, 597,416 and 706,880 (the first two of these now being Patents 1,541,693 and 1,544,529 respectively).

The invention relates to fabric, paper or other sheet form material having on its surface a water resistant flexible coating which is substantially non-inflammable and which also reduces or supresses the inflammability of the material itself. In particular it relates to such material coated with compositions having chlorinated rubber as a basis.

Many water resistant coatings on the market at the present time do not decrease the inflammability of the product, and some, particularly those containing nitrocellulose, may actually increase it. On the other hand the various fireproofing or inflammability-suppressing compositions are, in very many cases, not water resistant or water repellent, and some may even be leached or dissolved out, by action of water.

Chlorinated rubber, which may be made by allowing chlorine to react upon raw rubber, varies in its properties according to the degree of chlorination to which the rubber has been subjected. All varieties or grades of chlorinated rubber are insoluble in water and unaffected thereby, and films or coatings made of this material resist the penetration of water to a marked extent. The various grades, however, differ considerably in the ease with which they will ignite and in the extent to which they diminish or suppress the inflammability of other substances. Chlorinated rubber containing only small percentages of combined chlorine may ignite and continue to burn slowly or if slightly more highly chlorinated it may cease to maintain combustion a few moments after ignition.

Very highly chlorinated rubber, containing 67 per cent or more of combined chlorine is practically impossible to ignite. The fire-suppressing qualities of the different grades are in much the same order. To suppress the inflammability of a given weight of sheet material will require a heavier or lighter coating in accordance with the grade of chlorinated rubber employed, that is more chlorinated rubber of low degree of chlorination is required than when a more highly chlorinated product is used. It is one object of this invention to proportion the thickness, or weight, of the coating to the degree of chlorination of the chlorinated rubber employed so as to achieve fire-resistant properties.

In the event that chlorinated rubber of a very low degree of chlorination is employed or the backing is especially inflammable it may be desirable to impregnate the backing before coating with a fire-proofing salt such as the phosphates, tungstates and the like. The substantially impervious chlorinated rubber coating when applied to such a treated fabric seals in the impregnating salt so that it cannot be leached out by the action of water and thus retains its effectiveness.

Material coated with chlorinated rubber compositions may find a variety of uses. Muslin or other suitable material which is inflammable and permeable to water may be coated and used in the manufacture of window shades where the water- and fire-resistant qualities of the material are important. Decorative effects may be achieved, e. g. in the coating of chintz or cretonne, as in the manufacture of glazed chintz and the product used for hangings, upholstering, automobile interiors etc. Wall paper may be water-proofed and its appearance enhanced by the application of a similar coating.

The coatings are most easily applied by means of a solution of the chlorinated rubber in a suitable solvent, benzol and its homologues, solvent naphtha, the chlorbenzols, carbon tetrachloride, acetylene tetrachloride, trichlorethylene, carbon bisulphide and other rubber solvents being available for this purpose. In many instances a more flexible coating is desired than can be obtained with chlorinated rubber alone, especially when the highly chlorinated grades are used. In these cases addition of softeners or flexibilizing agents to the solution is often desirable. Suitable substances are diethyl phthalate, triphenyl or tricresyl phosphate, corn oil, peanut oil, or other compatible vegetable oils, pentachlorethane and the like, either singly or in various combinations. These softeners or flexibilizing agents blend homogeneously with the chlorinated rubber, when applied in the manner herein described. Of these agents, the aryl phosphates are especially suitable since they are themselves non-inflammable. Clearly a non-inflammable softener is better, in a fireproofing coating, than an inflammable material, for application to the normally combustible base. If more than one coat is to be applied, coats after the first may contain a non-solvent, or even a precipitant in limited amounts, to diminish the softening action on previous coats; for instance alcohol may be employed in an amount just insufficient to cause precipitation of the chlorinated rubber. Suitable non-solvents are acetone and turpentine; among the precipitants are the alcohols, gasoline, kerosene, etc.

In some cases it is desirable to size the material before coating, to prevent penetration. Any suitable sizing material such as glue, starch, casein, etc. may be utilized, or a chlorinated rubber solution may be employed. The following is illustrative of a composition useful for this purpose:

5 parts by weight chlorinated rubber
55 parts by weight benzol
1 part by weight triphenyl phosphate
1 part by weight diethyl phthalate The material is immersed in the solution and after thorough impregnation the solvent is allowed to evaporate. The benzol used in this formula is readily inflammable, but since it evaporates it does not render the coating inflammable. The material may then be fulled to decrease stiffness.

In coating or "glazing" chintz, the following is an example of a suitable solution:

7.5 parts by weight highly chlorinated rubber (67 per cent or more chlorine)
22.5 parts by weight benzol
5 parts by weight toluol
2 parts by weight alcohol (ethyl or denatured)
2 parts by weight triphenyl phosphate
1 part by weight diethyl phthalate The solution is spread on the fabric which has previously been sized, in an amount such that after evaporation of the solvents the coated fabric will weigh approximately 57 per cent more than the sized fabric before coating. When thoroughly dry the coated material is calendered, giving a smooth moderately glossy surface substantially impenetrable to water. Strips of this material hung vertically will not burn when a flame is applied at the bottom.

For the above purpose the transparent or nearly transparent coating resulting from the procedure described is preferable. When muslin is to be coated for use as shade cloth, fillers such as clay, barytes, whiting etc. may prove useful to improve opacity; pigments also may be employed for the same purpose, as well as for coloring. Oil-soluble dyes may likewise be incorporated in the solution. By way of illustration the following procedure was followed in one experiment.

A piece of white muslin was sized with the solution of chlorinated rubber above described for that purpose and then coated on both sides with a mixture of the composition:

6.7 parts by weight highly chlorinated rubber (over 67 per cent chlorine)
13.3 parts by weight solvent naphtha
3 parts by weight corn oil
2 parts by weight alcohol (denatured)
20 parts by weight china clay.

The weight of the finished cloth was 280 per cent greater than that of the untreated muslin. The product was heavy, fairly stiff but flexible and very opaque. Strips suspended vertically could not be ignited. Immersion in water did not cause discoloration or deterioration.

For coating wall paper the composition may contain:

7.5 parts by weight chlorinated rubber
22.5 parts by weight benzol
10 parts by weight toluol
2 parts by weight triphenyl phosphate
1 part by weight diethyl phthalate A moderately glossy surface is obtained which may be calendered if desired. The surface may be washed with water without deterioration.

Under some conditions chlorinated rubber, especially those varieties containing high percentages of combined chlorine, may show a tendency to give off small amounts of hydrochloric acid. When the chlorinated rubber is in contact with textile fabrics and the like, and where permanent strength is a requisite, this may be disadvantageous. By the use of such antacids as urea, aniline, diphenylamine, phenylene diamine etc. this condition may be corrected and the chlorinated rubber thus stabilized. The above antacid materials can be added to the chlorinated rubber solution in the manner well known in the art of applying antacid materials, a very small amount, say a few per cent being sufficient. When filling material is employed it may desirably be of an antacid nature, such as zinc oxide, magnesia and similar substances.

Certain resins, either natural or synthetic, may be incorporated and the use of dyes and pigments is not precluded.

In the foregoing, and in the appended claims, chlorinated rubber is referred to, but it is to be understood that the use, along with chlorine, of bromine or other halogens, making a chlorinated product also having other halogens in combination is not precluded, since included within the purview of this invention are chlorinated rubber products or chlorinated rubber derivatives which may contain other elements than simply chlorine, carbon and hydrogen, all to such extent as such products function in a manner similar or analogous to true chlorinated rubber. Likewise in place of natural rubber, artificial rubber may be employed in some cases as a basis for halogenation, or gutta percha, balata, etc. may be utilized.

This invention has been described in connection with a number of illustrative examples and formulas, to the details of which it is not to be considered as limited.

What I claim is:—

1. Water-resistant and fire-resistant composite material comprising a normally combustible sheet form backing carrying a coating rigidly adhering thereto, such coating comprising chlorinated rubber and a flexibilizing agent for said chlorinated rubber which itself is non-inflammable and which is blended homogeneously with such chlorinated rubber.

2. Water-resistant and fire-resistant composite material comprising a sheet form backing which would, in the absence of any fireproofing treatment, be readily inflammable, such backing carrying a coating rigidly adhering thereto, such coating comprising chlorinated rubber containing not below 67% of combined chlorine, and an oily flexibilizing agent for said chlorinated rubber which itself is non-inflammable and which is blended homogeneously with such chlorinated rubber.

3. Water-resistant and fire-resistant composite material consisting essentially of a sheet form normally combustible backing and a coating comprising chlorinated rubber and a softener therefor comprising an aryl phosphate.

4. Water-resistant and fire-resistant composite material consisting essentially of inflammable non-waterproof fabric base impregnated with a fireproofing salt and a sealing coating comprising highly chlorinated rubber and an aryl phosphate constituting a softener therefor, such aryl phosphate itself being non-combustible.

5. Fabric coated with a plastic flexible fireproofing material which includes a relatively solid material and an aryl phosphate acting as a flexibilizing agent therefor.

6. Fabric coated with a plastic flexible fireproofing material which includes a solid chlorinated fire-proofing agent having tri-cresyl phosphate incorporated therewith and acting as a flexibilizing and softening agent therefor.

7. A fire-resistant and water-resistant product which comprises normally inflammable fibrous material coated with an intimate mixture of chlorinated rubber and an aryl phosphate serving as a flexibilizing agent therefor.

8. Fireproofed material comprising a sheet-form base, which when alone would be readily combustible, such base carrying a fireproofing composition comprising stabilized highly chlorinated rubber and a flexibilizing agent therefor comprising an organic phosphate which is non-inflammable.

9. A chlorinated rubber composition comprising chlorinated rubber, a non-inflammable softener therefor and di-ethyl phthalate.

10. A chlorinated rubber composition comprising chlorinated rubber, an aryl phosphate serving as a flexibilizing agent therefor and di-ethyl phthalate.

CARLETON ELLIS.